Sept. 23, 1924.

T. F. HOLDEN

PROCESS FOR MANUFACTURING WATER GAS

Filed Oct. 17, 1922

Inventor
Thomas F. Holden
By Jas. L. Skidmore
His Attorney.

Sept. 23, 1924.  1,509,553
T. F. HOLDEN
PROCESS FOR MANUFACTURING WATER GAS
Filed Oct. 17, 1922   2 Sheets-Sheet 2
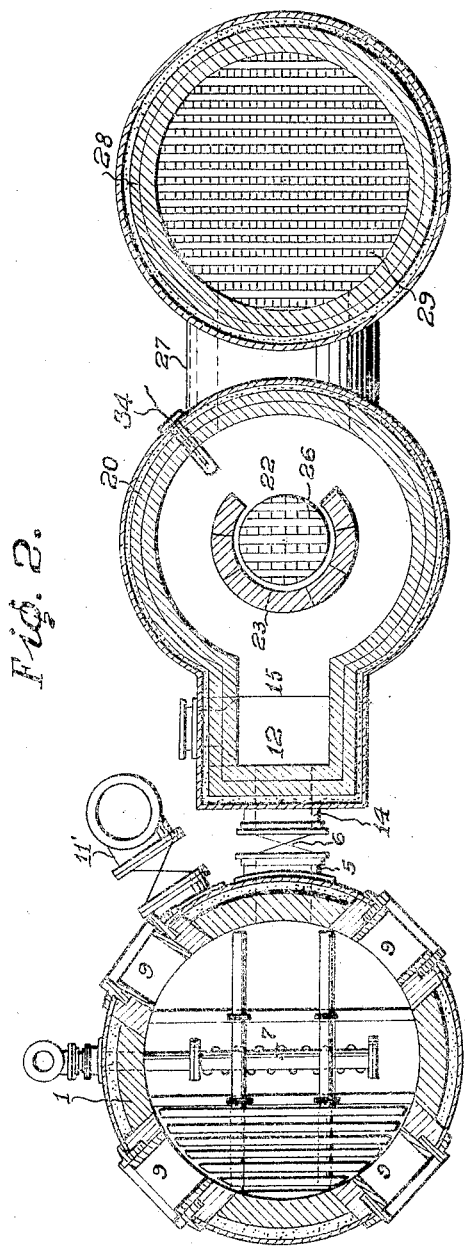
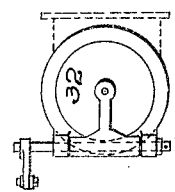
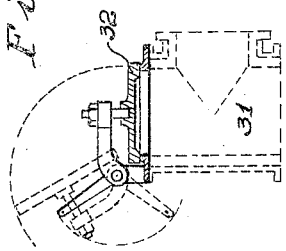
Inventor,
Thomas F. Holden,
By Jas. L. Skidmore
His Attorney.

Patented Sept. 23, 1924.

1,509,553

UNITED STATES PATENT OFFICE.

THOMAS F. HOLDEN, OF WASHINGTON, DISTRICT OF COLUMBIA, ASSIGNOR OF ONE-THIRD TO ROBERT D. WEAVER, OF WASHINGTON, DISTRICT OF COLUMBIA, AND ONE-THIRD TO CALVIN VOS, OF NEW YORK, N. Y.

PROCESS FOR MANUFACTURING WATER GAS.

Application filed October 17, 1922. Serial No. 595,112.

*To all whom it may concern:*

Be it known that I, THOMAS F. HOLDEN, a citizen of the United States, residing at Washington, District of Columbia, have invented certain new and useful Improvements in Processes for Manufacturing Water Gas, of which the following is a specification.

My invention relates to an improved and novel process for the manufacture of water gas and consists in making such gas from ignited fuel by a succession of alternate air and steam treatments, the air treatment being so conducted as to accumulate a maximum of sensible heat to the fire bed, and the steam treatment prolonged for a greater period than is customary; of using the sensible heat of the products escaping from the particular air treatment to heat the fire clay refractory region; of means for injecting straight coal gas, either rich or lean in B. t. u. quality as conditions may allow and providing a thorough commingling and mixture between the said rich or lean coal gas and the resulting water gas that is made in the generator, and of enriching the said gas produced in the steam treatment in such refractory region by sprayed or vaporized oil, as more fully hereinafter described.

The prime object of this invention is to provide a simple, economical, and thoroughly efficient process for the manufacture of water gas, whereby a superior grade and greater volume of gas can be made than by any process using apparatus of equal proportions that is now employed in the manufacture of such gas.

Another object of the invention is to so conduct my improved process as to eliminate the possibility of any excess in the capacity of water gas over the blending, mixing, and fixing capacities of the water gas and enriching oil into a good standard commercial carbureted water gas, as is now experienced with other processes where the generator is far above the mixing and fixing capacities of the carburetor and super-heater, that cause an unfixed or streaky quality of carbureted water gas to be produced.

Another object in carrying out the process is to provide what may be properly termed an economizing chamber at one side of and forming a portion of the carbureter, adapted to more thoroughly heat the water gas as it is passed upward therethrough, thus delivering said gas into the primary mixing chamber formed at the top portion of the carbureter at a much higher temperature, and producing a drier water gas, before it meets the enriching oil being sprayed into said mixing chamber, since the hot water gas entering into the economizing chamber is protected from the existing chilling during its said passage owing to the thicker and better lined refractory tile walls of the economizing chamber.

Another object in carrying out this process is to so construct my improved carbureter with a primary mixing chamber so formed in its top portion, that the water gas is separated into two streams and said gas is not allowed to meet the enriching oil which is being sprayed into the top of said chamber until the oil has had sufficient time to become thoroughly vaporized and gasified, when they are thoroughly commingled and mixed together and caused to pass down through the checker-work in the secondary mixing chamber and become more generally and thoroughly blended together, from whence they pass out, into and up through the super-heater where they are more readily fixed into a commercial gas, thus resulting in what is known as carbureted water gas of any desired B. t. u. standard.

Further objects in carrying out my novel process are to provide more efficient and improved refractory surfaces than are now provided in the standard processes, to insure improved oil results and a corresponding superior fixed carbureted water gas, with less loss of fuel efficiency; to so conduct the process as to permit the use of any grade of generator fuel of reasonable standard, such as anthracite coal, oven, chamber or retort coke, and bituminous coal of low sulphur content; to materially increase the capacity above that obtained by any existing water gas process; to lessen the enriching oil used per M. cu. ft. of gas produced; to eliminate the excessive accumulation of tarry waste and reduce the formation of lamp black to the lowest possible minimum; to reduce and prevent clinker formation when the process is properly conducted, hence furnishing a freer and improved circulation of the air and steam blast through the fuel bed, and to change any existing water gas method to my method at comparatively slight expense to the operating company.

The foregoing and such other objects as may appear from the ensuing description are accomplished by the construction, arrangement, combination and location of the parts which constitute an embodiment of my invention by which the process may be carried out and will now be described with reference to the accompanying drawings, after which my invention will be particularly pointed out in the claims appended hereto.

In the accompanying drawings forming a part of this specification it will be seen that:

Figure 2 is a cross section taken on the plane of the dotted line 2—2, Fig. 1.

Figure 3 is a detail partly in vertical section showing the usual valve seated on the top outlet of the superheater, and Figure 4 is a plan of the detail shown in Fig. 3.

Figure 1:
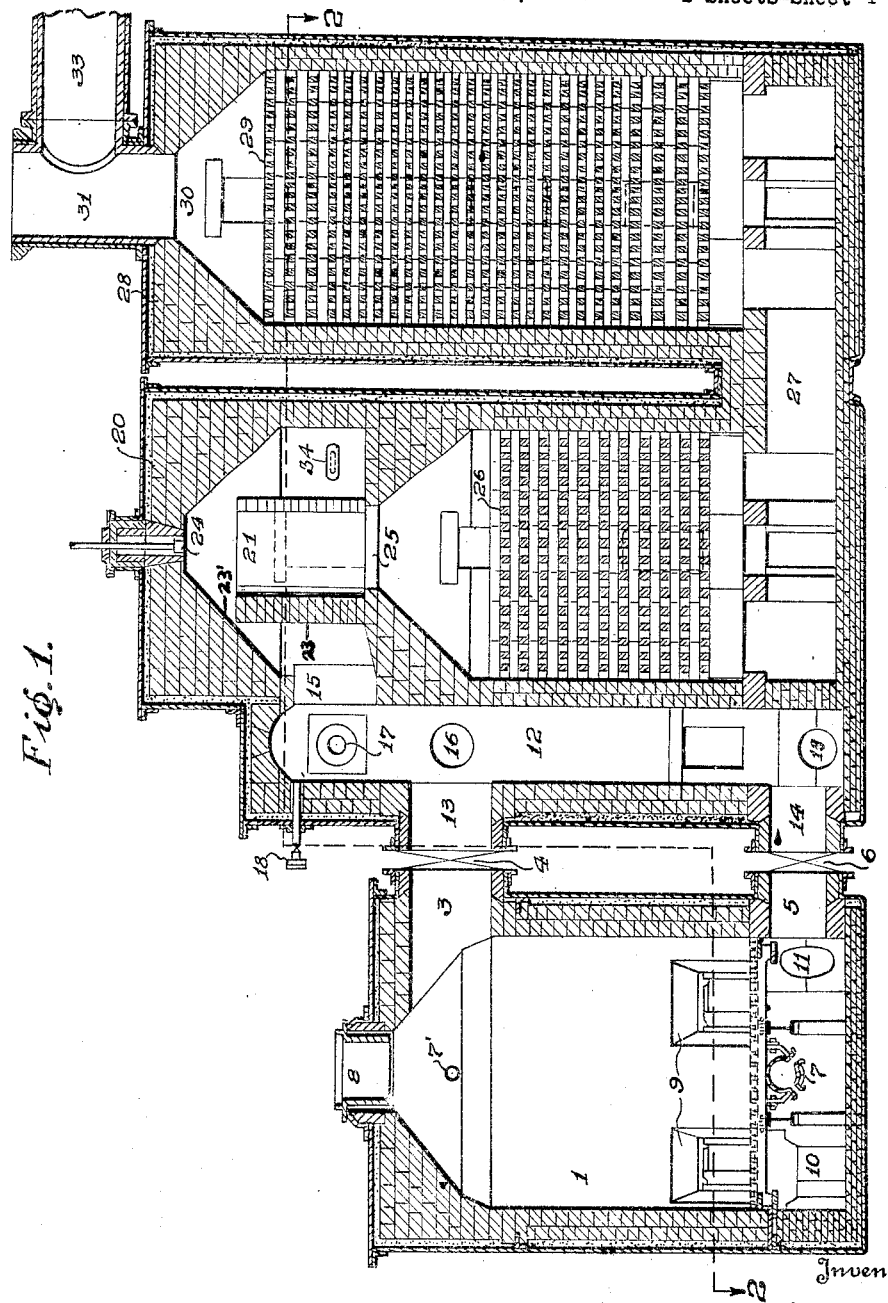
Figure 1 is a vertical section of the improved apparatus embodying my invention.

In the embodiment of my invention as illustrated, the numeral 1 indicates the generator provided with an upper up-run water gas outlet 3, and an upper hot gas outlet gas valve 4, while 5 designates the lower or down-run water gas outlet and 6 the lower gas outlet gate valve. 7 is the lower steam manifold or steam distributor for an up-run of water gas, 7' is the upper steam supply for a down run of water gas, 8 is the top cooling hole or opening, 9 is the cleaning or stoker doors, 10 is the ash cleaning doors, 11 is the primary air blast inlet, 11' is the elbow connected with said inlet, 12 is the economizer chamber between the generator and carbureter and forming a part of said carbureter at one side thereof, 13 is the upper gas inlet to said chamber, 14 is the lower gas inlet to the chamber 12, 15 is the gas outlet from the upper portion of the chamber, 16 is the secondary air blast inlet connected with said chamber 12, 17 is the rich or lean coal gas inlet leading to the chamber, 18 is the sight cock and 19 is the ash or residue cleaning opening formed in the lower or bottom portion of the economizing chamber.

The carbureter 20 is provided at its upper end portion with a primary mixing chamber 21 having a hot gas inlet 22 to the chamber, said chamber being formed by a horse-shoe or U-shaped refractory deflecting wall 23, said wall being sealed by expansion in contact with the inner upper surface 23' of the carbureter, 24 is the oil spray nozzle suitably fitted in the upper end of the carbureter in communication with the chamber, and 25 is the opening leading from chamber 21 for the passage of the mixed water gas and oil gas from said primary mixing chamber into the secondary mixing chamber forming the body and lower portion of the carbureter, said latter chamber being substantially filled with refractory checker-work 26, through said checker-work and into the connecting passage 27 between the carbureter and superheater 28, thence into and through the refractory checker-work 29 and through the outlet or gas take-off opening 30 into the stack or gas T 31, provided with the usual valve 32, and thence through the gas take-off connections 33 to the washer box (not shown), and 34 indicates the pyrometric control connected with said primary mixing chamber.

The air, steam, coal gas, and oil used in connection with this apparatus may be supplied from any suitable or desirable source, and either live steam or exhaust steam or both may be employed.

It will be perceived that my improved water gas apparatus is especially designed for use in connection with what is known as the up and down run, and is so constructed that the hot water gas entering the economizing chamber 12 from the generator is protected from the usual chilling effect during its passage due to the thicker and improved refractory tile walls formed in said chamber and as the said water gas enters from the top of said chamber into the carbureter it impinges upon and contacts with the highly heated refractory deflecting wall 23 which causes the gas to be separated into two streams and directs said streams around the wall, thus preventing the said water gas meeting the enriching oil which is being sprayed into the primary mixing chamber 21, until the said enriching oil has had sufficient time to be thoroughly vaporized and gasified in the highly heated mixing chamber by contact with the highly heated wall 23, when the water gas entering into the primary mixing chamber through the inlet 22 thoroughly commingles and is mixed with the oil gas, the resultant gas product passing through the opening 25 into the secondary mixing chamber, through the specially prepared checker-work in the latter chamber, thus being more thoroughly blended, whence it passes out, into and up through a mass of specially prepared checker-work in the superheater where it is readily fixed into a commercial gas. The blast gases being more highly heated in their passage through the improved channels formed by my construction will provide an improved and more rapid means of regeneration of the desired temperature for another succeeding run of water gas, with less loss of fuel efficiency, and since I provide improved refractory surfaces over those now provided in the standard type of water gas apparatus, the said gas is delivered much higher in temperature, and therefore a drier gas, before it meets the enriching oil being sprayed into the top of the primary mixing chamber of the carbureter, hence assuring improved oil results and a correspondingly superior fixed carbureted water gas product.

While it will be understood that my construction allows for the use of any grade of generator fuel of reasonable good standard, by the use of bituminous coal I can materially cheapen the production of water gas below the cost made on any of the well known gas apparatus. The oil used to make a 600 B. t. u. standard of carbureted gas will be less than best results obtainable on any known water gas apparatus. Again, I have provided in connection with my apparatus an intake 17 for natural gas, or straight coal gas, either rich or lean in B. t. u. quality as conditions may allow. The said intake is positioned at the top portion of the economizing chamber between the generator and carbureter proper, and provides a mixture between the said rich or lean coal gas and the resulting water gas that is made in the generator, which will permit of a material reduction in the usual oil per m. cu. ft. of gas made in my apparatus from what can be shown by the operation of any of the known water gas apparatus.

It is well known that water gas made from bituminous coal is of superior quality to that made from anthracite coal or any grade of coke; the greatest detriment to its use is the liability of its clouding or fouling the passages between the checker-work in the carbureter and superheater, but this fear is allayed by the material employed and the improved method used in the arrangement of the checker work used in my construction, and the use of bituminous coal is preferred since a superior and cheaper gas is produced therefrom.

The gas made by my apparatus will eliminate the excessive production of oily water gas tar, or condensates, due to the fact that the water gas and enriching oil are so blended together as to produce a more stable non-condensable product. This form of apparatus can be built and maintained as cheaply as any of the known type of apparatus employed for the same purpose; all parts are readily accessible when repairs are deemed necessary, and greater economy in maintenance is obtained than for any other known water gas apparatus.

When bituminous coal is used for the manufacture of water gas or for the generation of steam, considerable difficulty is experienced in preventing the emission of dense black smoke therefrom, out through the stack or chimney and into the atmosphere, which emission of smoke is both a nuisance and a serious waste of energy and may be eliminated in certain localities that now have or may have ordinances against such nuisances, and since bituminous coal must be utilized in certain localities, for the manufacture of water gas where anthracite coal and oven or chamber coke is prohibitive in cost, some improved means other than those used at present must be utilized to permit of its use in order to eliminate the smoke nuisance.

In my process of operation when using the said bituminous coal, it is charged into the generator by hand or suitable mechanical power, immediately before making what is commonly termed a down run of water gas. By this method, the down run steam supply is turned into the generator, and as it enters at and above the live fuel bed in the generator, the said volume of steam picks up the fine or light particles of the said bituminous coal, forces and carries them down and through the said live fuel bed and gasifies the said coal in such a complete manner, as to constitute more perfect combustion thereof, and thereby remove the possibility of a smoke nuisance when the said water gas set is next purged out after that particular run of gas.

By my method, I also materially reduce the liability and possibility of the said waste fuel clogging or fouling the surfaces of the checker work in the form of unconsumed carbon or slag, thus maintaining superior refractory efficiency of the said checker work in the carbureter and superheater of my apparatus, this method being both novel and efficient far excels the practice usually employed, and constitutes an addition for the more economical production of water gas, which is assured by the operation of my improved apparatus.

By this construction of apparatus the capacity is increased from 20 to 25 per cent, and the fuel consumption is materially reduced below the best results obtainable by any other known water gas apparatus, and the enriching oil used per m. cu. ft. of gas produced is lessened, and at the same time a cheaper and superior quality of water gas will constitute the resultant product.

The six bottom rows of checker-work disposed in the superheater or fixer are formed from the standard checker-brick and are so spaced as to suit any desired grade of fuel, then I use what is known as the standard blast furnace brick 2¾ inches square by 9 inches long until these reach the top six courses of the said checker-work, the top six courses being of standard checker brick, like those of the six lower courses, said top six courses being spaced with each course one eight of an inch wider than the preceding course, hence the top layer or course is spaced wider apart than the other layers or courses to allow for the natural expansion of the gas, thus an increased area of refractory surfaces are formed and an improved method of arranging the checker-work is employed.

By injecting coal gas of low B. t. u. standard through the intake 17 into the upper part of the chamber 12, and mixing it with the water gas under high temperature regulation and control, said temperature control causes a more intense affinity and more thorough blending of the gases, thus resulting in the production of an increased volume of a uniform non-stratifiable, and non-condensable commercial gas of the desired B. t. u. quality such as may be required in any particular locality, while the injection of natural gas of high B. t. u. standard through said intake, and mixing it with uncarbureted water gas under high temperature control serves to reduce its B. t. u. quality, and results in producing an increased volume of uniform commercial gas of the B. t. u. standard required or desired, as will be readily obvious to those skilled in the art of the production of gases.

It will be understood that by the construction and arrangement of the apparatus hereinbefore described I am enabled to prolong the gas run from 20 to 30 per cent longer than in the existing standard gas apparatus, for the reason that the air is so delivered as to cause a regeneration of heat in the fuel bed and on the increased area and improved refractory surfaces employed.

Having thus described my invention what I claim and desire to secure by Letters Patent is:—

1. The process of making water gas which consists in making said gas in a generator by a succession of alternate up and down treatments, passing the water gas formed in a single stream into a highly heated economizing chamber, thence dividing said water gas into separated streams by contact with the walls of a highly heated primary mixing chamber, thence into said mixing chamber and thence enriching the water gas, thence into and through the refractory material in a secondary mixing chamber, and thence through the refractory material in a fixing chamber or superheater.

2. The process of making water gas which consists in making a gas in a generator by a succession of alternate up and down steam blasts, passing the water gas in a single stream into and through a highly heated economizing chamber, thence dividing said water gas into separated streams by contact with the walls of a highly heated primary chamber, thence into said mixing chamber, subjecting said water gas to an enriching oil vapor within said mixing chamber where they are thoroughly mixed and commingled, thence passing the mixture into and through the refractory material disposed in a secondary mixing chamber, and finally passing said mixture through the refractory material disposed within the superheater to produce a commercial gas.

3. The process of making water gas which consists in making a gas in a generator by a succession of alternate up and down steam treatments, passing the water gas in a single stream into and through a highly heated economizing chamber, thence dividing said water gas into a plurality of streams by contact with the highly heated walls of a primary mixing chamber, spraying and vaporizing oil in said primary chamber, passing the water gas into said chamber and there enriching the water gas, thence passing the enriched mixture into and through a secondary mixing chamber, thence passing the mixture through the refractory material disposed in the superheater for forming a fixed commercial gas.

4. The process of making water gas which consists in making gas in a generator by a succession of alternate up and down steam blasts, passing the water gas in a single stream into an economizing chamber, injecting a combustible gas into said chamber for mixing with the gases therein, thence dividing said mixed gases into separated streams by contact with the highly heated walls of a primary mixing chamber, passing the said mixed gases into the primary chamber and there enriching the mixture, thence passing the mixture through a secondary mixing chamber, and thence through a superheater for forming a commercial gas.

5. The process of making water gas which consists in making a gas in a generator by a succession of up and down alternate steam treatments, passing the water gas in a single stream into an economizing chamber, thence dividing said water gas into a plurality of streams by contact with the highly heated walls forming a primary mixing chamber, thence passing the water gas around said walls and into the primary chamber, enriching said water gas by spraying oil into contact with said walls and converting said oil into a gaseous vapor, mixing and thoroughly commingling said vapor and water gas within said chamber, thence passing the mixture into and through a secondary mixing chamber, and thence through a superheater.

6. The process of making water gas which consists in making a gas in a generator by a succession of up and down steam blasts, passing the water gas in a single stream into an economizing chamber, thence dividing said water gas into a plurality of streams by contact with and around the highly heated walls of a primary mixing chamber, thence into said chamber and there enriching the gas, thence into and through a secondary mixing chamber, and thence into and through a superheater.

7. The process of making water gas which consists in passing the gas from the generator in a single stream into an economizing chamber, thence dividing the stream into a plurality of streams by passing it into contact with and around the highly heated walls forming a primary mixing chamber, thence into said mixing chamber and there enriched by vaporized oil, thence passing the gas into and through a secondary mixing chamber, and thence into and through a superheater for fixing into a commercial gas.

8. The process of making water gas consisting in passing the gas from the generator in a single stream into a highly heated economizing chamber, injecting another combustible gas into said economizing chamber and mixing said gases under high temperature pyrometric control, thence passing the products so formed through a primary mixing chamber, thence through a secondary mixing chamber, and thence through a superheater.

9. The process of making water gas consisting in passing the gas from the generator into a highly heated economizing chamber, injecting another combustible economizing gas into said chamber and mixing said gases under high temperature pyrometric control, thence passing the product in separated streams into contact with and around the highly heated walls of a primary mixing chamber, thence into the mixing chamber, thence through a secondary mixing chamber, and thence through a superheater for the production of an increased volume of commercial gas of the required standard.

THOMAS F. HOLDEN.